United States Patent Office 3,487,249
Patented Dec. 30, 1969

3,487,249
COMMUTATORS
Bertram Frank Nicholls, Sutton Coldfield, and John Stanley Detheridge, Birmingham, England, assignors to Joseph Lucas (Industries) Limited, Birmingham, England, a British company
Filed July 12, 1967, Ser. No. 652,393
Claims priority, application Great Britain, July 29, 1966, 34,183/66
Int. Cl. H01r 39/06
U.S. Cl. 310—234     2 Claims

ABSTRACT OF THE DISCLOSURE

A commutator for a dynamo electric machine including slots in the conductive segments thereof for receiving the ends of the rotor windings of the dynamo electric machine, and insulating parts carried by the commutator and associated with the segments for guiding the ends of the windings into the slots when the communtator is moved axially relative to the rotor of the dynamo electric machine during assembly of the machine.

---

This invention relates to commutators for dynamo electric machines and more particularly to face commutators.

A commutator according to the invention includes slots in the conductive segments thereof for receiving the rotor windings of a dynamo electric machine and insulating parts carried by the commutator and associated with said segments for guiding the ends of the windings into said slots, when the commutator is moved axially relative to the rotor during assembly of the machine.

The term segment is used herein to include the conductive parts of the cummutator on which the brushes of the dynamo electric machine run in dynamo electric machines having barrel or face commutators.

Figures 1, 2:
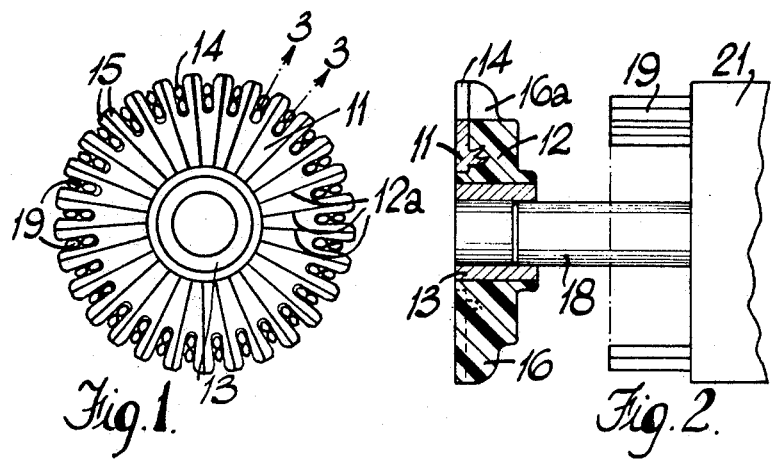
Figure 3:
Figure 4:
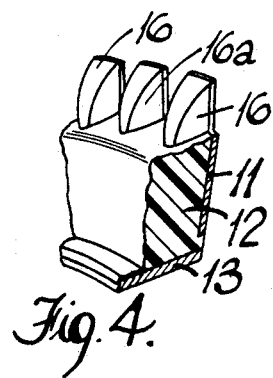

One example of the invention is illustrated in the accompanying drawings wherein:

FIGURE 1 is a plan view of a face commutator showing the ends of the rotor windings, FIGURE 2 is a sectional view of part of a dynamo electric machine utilizing the commutator shown in FIGURE 1, during one stage in its construction, FIGURE 3 is a sectional view on the line 3—3 in FIGURE 1 but to an enlarged scale and FIGURE 4 is a fragmentary rear perspective view of the commutator.

Referring to the drawings the commutator includes a plurality of conductive segments 11 carried by a moulded insulating body 12, the segments 11 being spaced apart and insulated from one another by integral parts 12a of the body 12 and the bdoy 12 being formed with an axial bore within which is secured a sleeve 13. In use the sleeve 13 is an interference fit on the rotor shaft of a dynamo electric machine.

Each of the segments 11 is formed with a radial slot 14 within which in use the ends of the rotor windings of the dynamo electric machine are engaged. The radial slot 14 splits the periphery of each segment 11 into two fingers 15. Each of the fingers 15 is supported, together with its adjacent finger on the adjacent segment, by a moulded projection 16 of the body 12. The width of each of the projections 16 measured circumferentially of the commutator varies along the radial length of the projection from a maximum at the free end of the projection to a minimum at the body 12 and moreover the width of each projection at any point along its radial length varies in a direction parallel with the rotational axis of the commutator from a maximum at the fingers 15 to a minimum at the free edge of the projection (FIGURE 4), the side faces 16a of the projections being substantially concave.

During assembly of the dynamo-electric machine, (FIGURE 2) the commutator is engaged with the rotor shaft 18 of the machine and moved axially towards the ends 19 of the rotor windings 21, which extend towards the rear of the commutator and are aligned approximately with the slots 14. As the commutator is moved axially, the ends 19 of the windings 21 are guided into the slots 14 by the surfaces 16a of the projections 16. The ends 19 of the windings 21 are then soldered into the slots 14 and the face of the commutator is machined to remove extraneous material.

Preferably, there is provided assembly means (not shown) acting between the rotor and the commutator for positioning the commutator in the correct angular position on the shaft with respect to the rotor.

Having thus described our invention what we claim as new and desire to secure by Letters Patent is:

1. A face commutator for a dynamo electric machine, comprising a moulded insulating body adapted for connection to a rotary shaft, a plurality of conductive segments moulded into said body and insulated from one another by integral parts of said body, slots in the segments for receiving windings, and guide portions integral with said body and extending rearwardly from the edges of said slots, said guide portions being inclined so that adjacent the slots adjacent guide portions are spaced apart by the width of a slot, but remote from the slots adjacent guide portions are spaced apart by more than the width of a slot, whereby said guide portions guide windings into the slots during assembly.

2. A commutator as claimed in claim 1 wherein the face of each of the insulating parts adjacent one of said slots is concave.

References Cited

UNITED STATES PATENTS

| 1,445,885 | 2/1923 | Hix | 310—233 |
| 2,316,652 | 4/1943 | Moeller | 310—235 |
| 2,915,658 | 12/1959 | Arnold | 310—236 X |
| 3,102,965 | 9/1963 | Ickes et al. | 310—235 |
| 3,253,172 | 5/1966 | Taylor | 310—235 |

MILTON O. HIRSHFIELD, Primary Examiner

EZRA SUTTON, Assistant Examiner

U.S. Cl. X.R.
310—235, 237, 270